US006347706B1

(12) United States Patent
D'Ambrosio

(10) Patent No.: US 6,347,706 B1
(45) Date of Patent: Feb. 19, 2002

(54) LUNCHBOX WITH VOICE RECORDING MECHANISM FOR MESSAGE DELIVERY

(76) Inventor: Elizabeth D'Ambrosio, 510 Undercliff Ave., Edgewater, NJ (US) 07020

( * ) Notice: Subject to any disclaimer, the term of this patent is extended or adjusted under 35 U.S.C. 154(b) by 0 days.

(21) Appl. No.: 09/611,006

(22) Filed: Jul. 6, 2000

Related U.S. Application Data

(60) Provisional application No. 60/142,687, filed on Jul. 7, 1999.

(51) Int. Cl.⁷ ............................................. A45C 11/20
(52) U.S. Cl. .................... 206/541; 206/232; 206/459.1; 206/459.5
(58) Field of Search .............................. 206/232, 459.5, 206/541, 542, 545, 459.1; 62/457.7; 40/312, 313

(56) References Cited

U.S. PATENT DOCUMENTS

| | | | |
|---|---|---|---|
| 2,484,661 A | | 10/1949 | Vogel |
| 3,777,418 A | * | 12/1973 | Cooper |
| D237,134 S | | 10/1975 | Westmoreland |
| 4,050,493 A | * | 9/1977 | Cho ............................ 150/35 |
| 4,279,342 A | | 7/1981 | Van Pelt |
| D268,390 S | | 3/1983 | Shaughnessy |
| 4,700,395 A | | 10/1987 | Long |
| 4,852,293 A | * | 8/1989 | Levine et al. ............... 190/110 |
| 4,939,912 A | | 7/1990 | Leonovich, Jr. |
| D309,900 S | | 8/1990 | Illsley |
| D327,607 S | | 7/1992 | Leonovich, Jr. |
| D334,868 S | | 4/1993 | Lau Woon |
| 5,207,303 A | * | 5/1993 | Oswalt et al. ............... 190/108 |
| 5,235,822 A | | 8/1993 | Leonovich, Jr. |
| D343,992 S | | 2/1994 | Melk |
| D347,765 S | | 6/1994 | Unkefer |
| 5,387,108 A | * | 2/1995 | Crowell ....................... 434/319 |
| 5,421,172 A | | 6/1995 | Jones |
| 5,431,265 A | * | 7/1995 | Yoo ............................ 190/103 |
| 5,447,041 A | | 9/1995 | Piechota |
| D364,161 S | | 11/1995 | Campbell |
| D365,733 S | | 1/1996 | Freedland |
| D367,404 S | | 2/1996 | Scheffer et al. |
| 5,499,465 A | * | 3/1996 | Manico ........................ 40/152 |
| 5,500,636 A | * | 3/1996 | Mitchell ..................... 340/328 |
| D371,051 S | | 6/1996 | Melk |
| D375,311 S | | 11/1996 | Keseling et al. |
| 5,755,180 A | | 5/1998 | Smith |
| 5,781,853 A | | 7/1998 | Johnson |
| 5,810,168 A | * | 9/1998 | Eggering ..................... 206/372 |
| 5,903,869 A | * | 5/1999 | Jacobson et al. ........... 704/272 |
| 5,905,429 A | * | 5/1999 | Hornstein et al. ........ 340/384.6 |
| 6,126,012 A | * | 10/2000 | Roegner ..................... 206/579 |

* cited by examiner

Primary Examiner—David T. Fidei
(74) Attorney, Agent, or Firm—Onofrio Law

(57) ABSTRACT

A lunchbox to promote communication between a caretaker and child comprising a container having a food compartment, a voice recording mechanism and a visual component. The voice recording mechanism is housed inside the walls of the container and enables a caretaker and/or child to record a message and permits said message to be retrieved by the child or caretaker.

14 Claims, 3 Drawing Sheets

LUNCHBOX WITH VOICE RECORDING MECHANISM FOR MESSAGE DELIVERY

This application claims the benefit of U.S. provisional application No. 60142,687 filed Jul. 7, 1999 which is incorporated herein by reference.

FIELD OF THE INVENTION

The present invention relates to a message delivery system for delivering a message from one individual to another. In particular, the invention provides a lunchbox with a voice recording mechanism for delivering messages to promote communication between caretaker and child.

BACKGROUND OF THE INVENTION

A majority of children are accustomed to receiving little notes in their lunchboxes from their mother, father or other caretaker. However, notes can get lost and small children, such as preschoolers, cannot yet read.

The present invention overcomes this limitation by providing a lunchbox with a voice recording mechanism for audio message delivery as a means to further communication between children and caretakers, especially when the children are at school.

In general, lunch boxes, coolers and audio systems, separately and in combination, are known in the art. Representative patents include: Des. 237,134 to Westmoreland; Des. 268,390 to Shaughnessy; Des. 309,900 to Illsley; Des. 327,607 to Leonovich; Des. 334,868 to Lau Woon; Des. 343,992 to Melk; Des. 347,765 to Unkefer; Des. 364,161 to Campbell; Des. 365,733 to Freedland; Des. 367,404 to Scheffer; Des. 371,051 to Melk; Des. 375,311 to Keseling; U.S. Pat. No. 2,484,661 to Vogel; U.S. Pat. No. 4,279,342 to Van Pelt; U.S. Pat. No. 4,700,395 to Long; U.S. Pat. Nos. 4,939,912 and 5,235,822 to Leonovich; U.S. Pat. No. 5,421,172 to Jones; U.S. Pat. No. 5,447,041 to Piechota; U.S. Pat. No. 5,755,180 to Smith and U.S. Pat. No. 5,781,853 to Johnson.

Advantage of the present invention over the known art is in the combination of a lunchbox with a voice recording mechanism which is used to deliver audio messages and to promote communication between individuals, particularly between a parent and child. The present invention provides such a lunchbox comprising a container having a food compartment and a voice recording mechanism. The voice recording mechanism enables a child to hear a special message from their parent at snack time, lunchtime or any other time. For example, "Tonight is pizza night" or "Good luck with your quiz". The invention can help families by enhancing communication, or can be used as a tool, for listening to special messages on a daily basis.

A general objective of the invention is to provide a lunchbox that furthers communication between caretaker and child.

Another broad objective of the invention encompasses a message delivery system for delivery of an audio message from one individual to another.

A more specific object of the invention is to promote communication between caretaker and child, as well as strengthen the parent-child bond.

Another object of the invention is to provide a recording device which allows a child to record a message back to parent or caretaker.

Another object of the invention is to provide a recording device in a lunch box that is actually a walkee/talkee, to permit direct communication between the caretaker and child. The lunchbox is fun and simple to use. It promotes communication, listening skills, family bonds and security. It can also act as a reminder.

SUMMARY OF THE INVENTION

In the present invention, these purposes, as well as others which will be apparent, are achieved generally by providing a lunchbox to promote communication between a caretaker and child comprising a container having a food compartment and a voice recording mechanism. The voice recording mechanism enables a caretaker and/or child to record a message and permits said message to be retrieved by the child or caretaker.

The lunchbox can further include a visual component. The visual component comprises photographs, written messages or any other visual means to communicate a message.

The lunchbox can further include a storage area for carrying or storing objects including but not limited to library cards, lunch money and keys.

The lunchbox is a container preferably of rectangular construction and comprised of a soft durable material. However, other container shapes and materials are encompassed within the scope of the invention. The lunchbox can be constructed of fabric, plastic or metal materials.

The invention also provides a message delivery system for delivering a message from one individual to another. In general an audio means is provided comprising: (i) recording means for selectively recording sound input, (ii) playing means for audibly playing said sound input from said recording means and (iii) power means for powering said audio means, so that a user can record sound and play back sound upon command.

The message from one individual to another comprises an audio component consisting essentially of said audio means, whereby an individual records an audio message in said audio means and another individual selectively plays back the audio message.

Other objects, features and advantages of the present invention will be apparent when the detailed description of the preferred embodiments of the invention are considered with reference to the drawings, which should be construed in an illustrative and not limiting sense as follows:

DETAILED DESCRIPTION OF THE INVENTION

In accordance with the present invention a lunchbox is provided to promote communication between a caretaker and child comprising a container having a food compartment and a voice recording mechanism. The voice recording mechanism enables a caretaker and/or child to record a message and permits said message to be retrieved by the child or caretaker.

The lunchbox may further comprise a visual component including photographs or written messages. Note pads and a pen or pencil can also be included in the visual component to further communication between parent and child.

Figure 1:
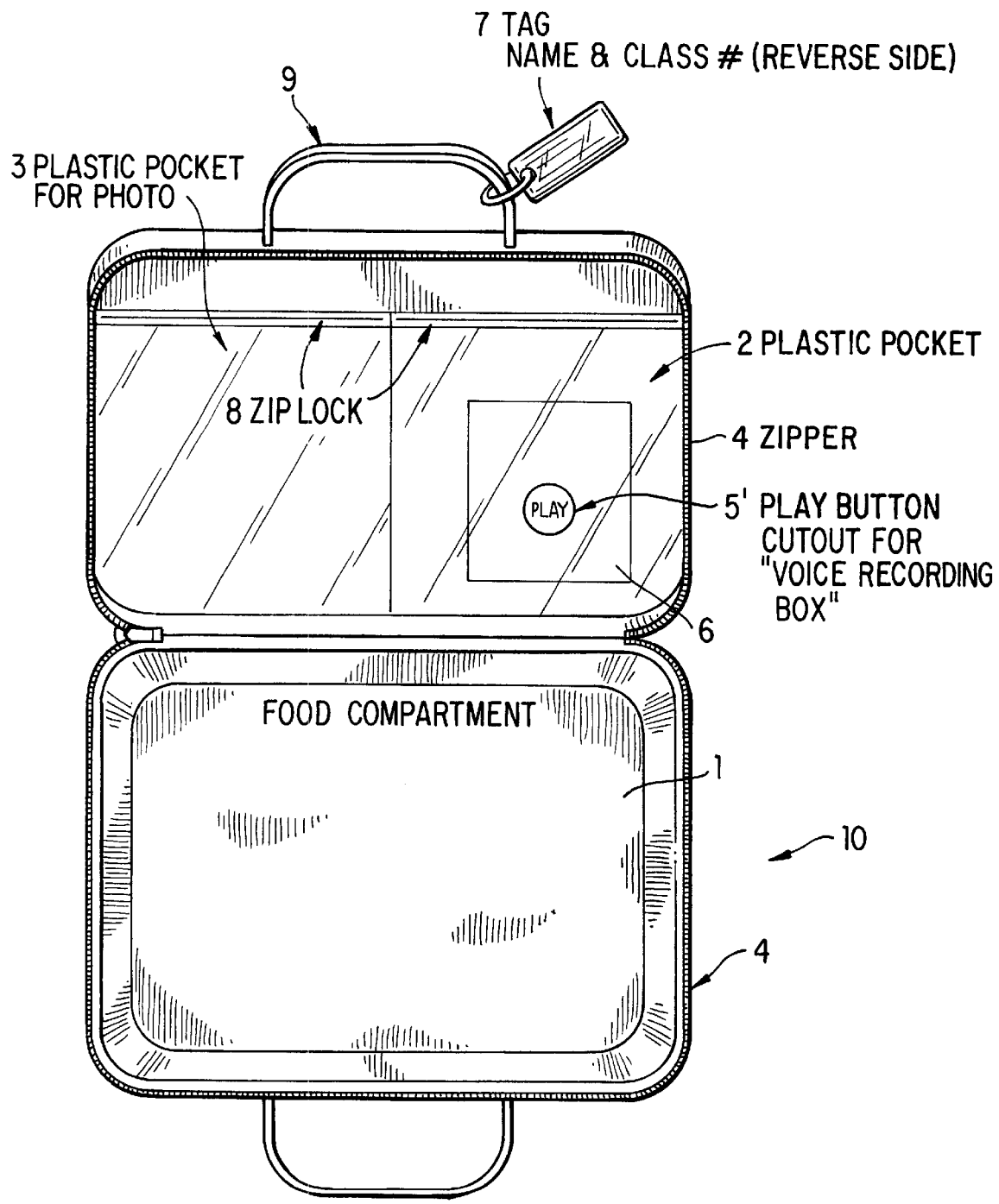
FIG. 1 is an illustration of an embodiment of the invention.
Figure 2:
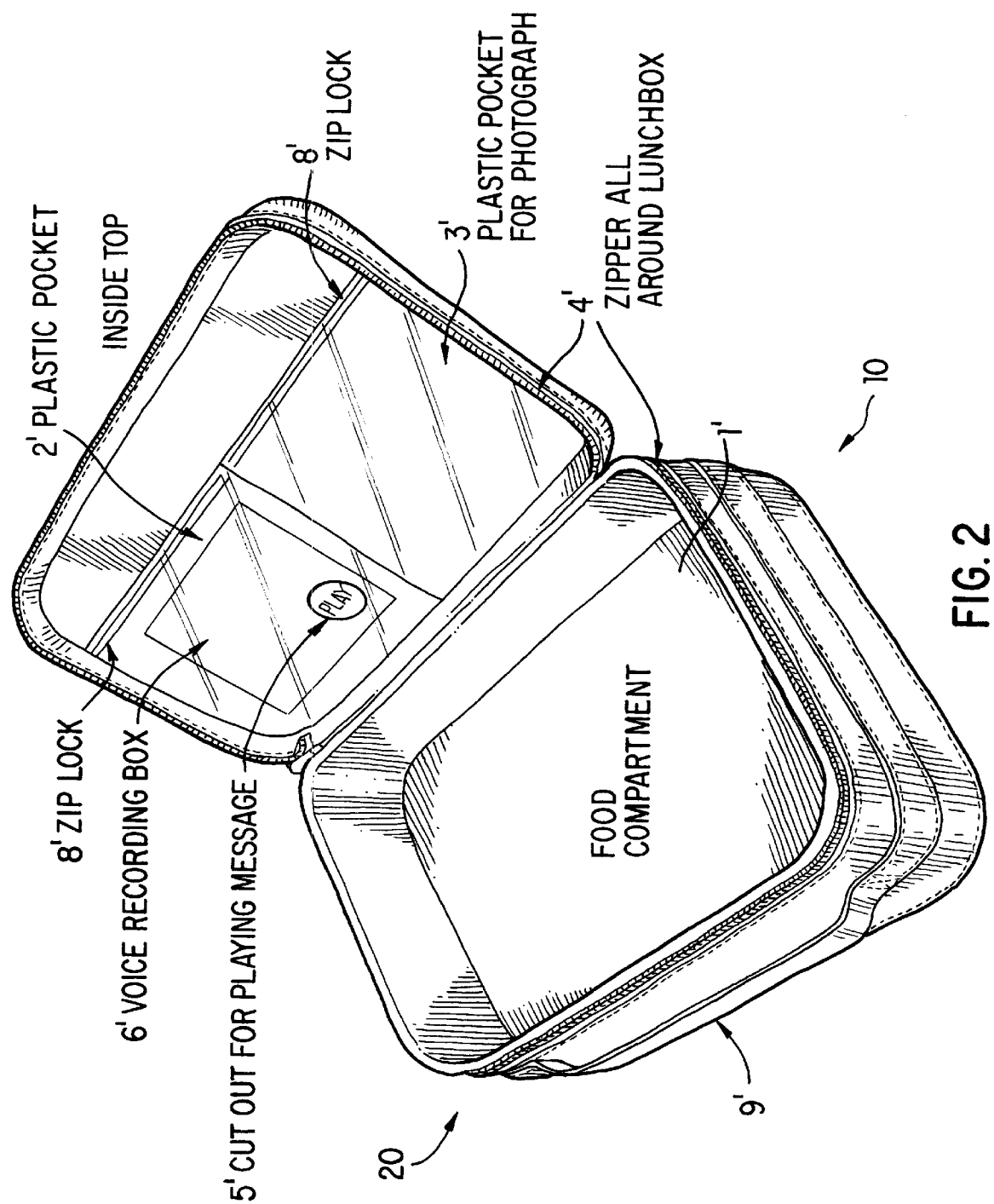
FIG. 2 is an illustration of another embodiment of the invention.
Figure 3:
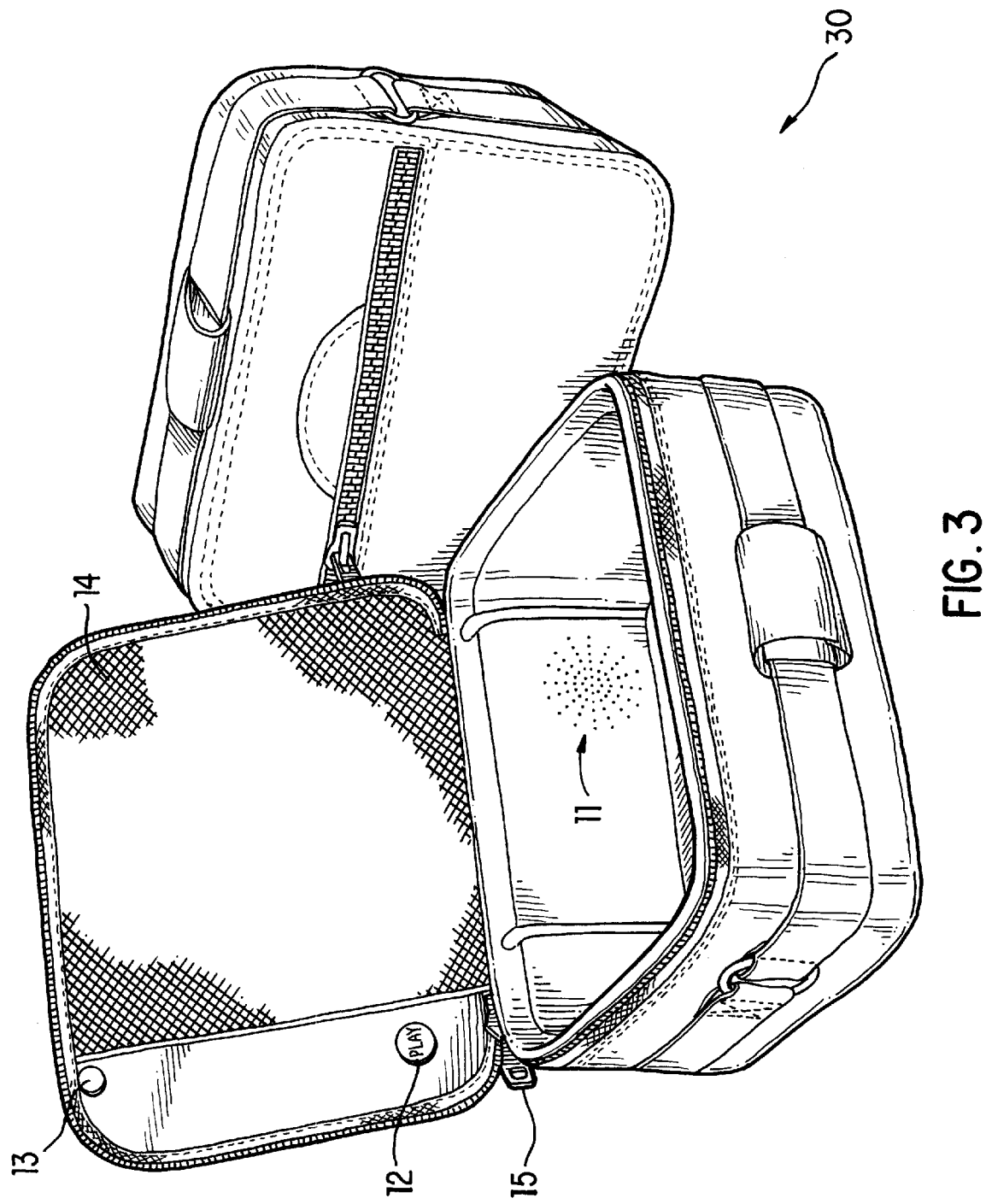
FIG. 3 is an illustration of another embodiment of the invention.

FIGS. 1, 2 and 3 illustrate embodiments of the lunch box of the invention. In FIG. 1, the bottom section of the lunch box comprises food compartment 1 which is used to house lunch foods and beverages. The top section of the lunch box contains two clear plastic pocket sections 2 and 3 which can be used to house visual components previously described, the recording mechanism itself, or other objects including but not limited to library cards, lunch money and keys. These plastic pocket sections can be closed 8 using a zip lock closing or velco strips to secure and protect the contents that are placed inside. The voice recording mechanism 5 in this embodiment fits securely in the right plastic pocket with a hole cutout for the PLAY button 5 for easy access by the user. The plastic pocket protects the device and other contents from potential liquid damage. The user touches the PLAY button to activate the audio message. A similar RECORDING button, not illustrated, is also included in the lunch box to provide an easy access means to record an audio message.

Both the top and bottom portions of the container include zipper closures 4 to facilitate opening and closing the container. Handle 9 can be affixed with a tag 7 to include the owners name, address and other information.

FIG. 2 is a similar embodiment to that illustrated in FIG. 1 with the exception that the voice recording mechanism 5' and the PLAY button 6' are situated in the left plastic pocket.

FIG. 3 shows a preferred embodiment where the voice recording mechanism is built-in to the lower container section. The speaker portion 11 of the recording mechanism is visible in the back portion of the container but the mechanism itself is not visible. The recording mechanism can be removed by sliding or opening the back side of the container to replace batteries, tapes or the unit itself. This embodiment is preferred, especially for use by small children, which helps prevent losing or breaking the recording unit.

The PLAY button 12 is located on the top portion of the container with a separate volume control 13 located nearby. Other locations within the container of the PLAY button and volume control are contemplated to be within the scope of the invention. A similar RECORDING button, not illustrated, is also included in the lunch box to provide an easy access means to record an audio message.

In this embodiment the plastic pockets are replaced by a mesh pocket 14 for storage of objects or photos.

FIGS. 1, 2 and 3 show that the voice recording mechanism can be located in the left or right side of the inner top portion of the lunchbox or built-into the lower food compartment. These figures only illustrate certain embodiments of the invention and are not all inclusive. Other placements of the voice recording mechanism and storage pockets within the container are encompassed and included in the present invention.

The lunchbox container is preferably made of a soft durable plastic or similar material. However, metal or hard plastic materials can also be used. The container is preferably of rectangular construction, however, other shapes and materials are encompassed by the invention. The container walls can made of insulating material to keep items hot and/or cold as desired.

The invention also provides a message delivery system for delivering a message from one individual to another comprising an audio means comprising: (i) recording means for selectively recording sound input, (ii) playing means for audibly playing said sound input from said recording means and (iii) power means for powering said audio means, so that a user can record sound and play back sound upon command; wherein said message from one individual to another comprises an audio component consisting essentially of said audio means, whereby an individual records an audio message in said audio means and another individual selectively plays back the audio message.

The audio means can include a tape recorder or any device that can record and deliver audio messages. The audio means may also include a walkee/talkee type device.

The message delivery system further comprises a visual component including photographs, handwritten notes and messages.

The audio means is housed within an enclosure comprising a lower cavity defining an open-ended storage region; said storage region comprising an upper wall, a lower wall, a pair of side walls connecting there between and a bottom base connecting therewith; wherein said walls of said storage region extend distally from said bottom base.

The enclosure further comprises an upper cavity defining an open-ended lid region; said lid region pivotally fastened to said storage region for closing said storage region; said lid region comprising an upper wall, a lower wall, a pair of side walls connecting there between and a top base connecting therewith, wherein said walls of said lid region extend proximally from said top base towards said storage region for fastening thereto when said lid region is in a storage region closing position, wherein the proximal end of said lower wall of said lid region is pivotally connected to the distal end of said lower wall of said storage region.

A plurality of compartments sized to fit adjacently within said enclosure, said compartments comprising a liquid proof construction, said compartments comprising a distal face and a proximal face, wherein said distal face of said compartments is integrally connected within said enclosure, said compartments comprising a lower edge, an upper edge and a pair of side edges, wherein said lower edge and said side edges of said compartments are fixedly sealed and said top edge of said compartments is selectively sealed for inserting and removing an item selected from the group consisting of said audio means and said visual component, wherein material of said proximal face of at least one of said compartments is transparent.

A fastening means is also included for selectively sealing said upper edge of said compartments so that said item can be selectively removed or replaced within said compartments, wherein said first surface of said fastening means is affixed to said upper edge of said proximal face of said compartments and a second surface of said fastening means is secured to said upper edge of said distal face of said compartments for contacting said first surface of said fastening means, said fastening means extending along the upper edge of said proximal face and said distal face of said compartments.

The side walls of said lid region comprise a left wall and a right wall; wherein said playing means for said audio means comprises a round actuator extruding from said audio means. The compartments comprise a left and a right compartment, such that said inside face of at least one compartment comprises a transparent material so that said visual component can be inserted and viewed therethrough. The inside face of at least one compartment comprises a hole, wherein said hole is sized so that said actuator for said audio means can extrude through said hole so that a user can activate said audio means through said actuator.

The storage regions and said lid region are both constructed from a material selected from the group consisting of fabric, plastic and metal. The storage and liquid regions are preferably liquid proof.

The fastening means can comprise a pair of pressure-sensitive interlocking fastening surfaces or a pair of pressure-sensitive adherent fastening surfaces such as velcro.

The invention now being fully described, it will be apparent to one of ordinary skill in the art that many changes and modifications can be made thereto without departing from the spirit or scope of the invention as set forth herein.

What is claimed is:

1. A lunchbox to promote communication between a caretaker and child comprising:

a container having a food compartment comprising a lower cavity defining an open-ended storage region; said storage region comprising an upper wall, a lower wall, a pair of side walls connecting therebetween and a bottom base connecting therewith; wherein said walls of said storage region extend distally from said bottom base, said container further comprising an upper cavity defining an open-ended lid region; said lid region pivotally fastened to said storage region for closing said storage region; said lid region comprising an upper wall, a lower wall, a pair of side walls connecting therebetween and a top base connecting therewith, wherein said walls of said lid region extend proximally from said top base towards said storage region for fastening thereto when said lid region is in a storage region closing position, wherein the proximal end of said lower wall of said lid region is pivotally connected to the distal end of said lower wall of said storage region; and a visual component comprising at least one compartment on the surface of said container for displaying photographs, handwritten notes and messages; and a voice recording mechanism housed inside the walls or base of either said upper cavity or said lower cavity of the container comprising a separate speaker portion and a play button both visible on the surface of the walls or base of either said upper cavity or said lower cavity of said container;

wherein said voice recording mechanism enables a caretaker and/or child to record a message and permits said message to be retrieved by the child or caretaker.

2. The lunchbox according to claim 1, wherein said visual component comprises a mesh compartment on the surface of said lid region.

3. The lunchbox according to claim 1, wherein said visual component comprises a left and right compartment on the surface of said lid region such that the outer face of at least one compartment comprises a transparent material so that the visual component can be inserted and viewed therethrough.

4. The lunchbox according to claim 1, wherein said container is of rectangular construction and comprised of a soft durable material.

5. A message delivery system for delivering a message from one individual to another comprising:

an audio means housed within an enclosure wherein said enclosure comprises a lower cavity defining an open-ended storage region; said storage region comprising an upper wall, a lower wall, a pair of side walls connecting therebetween and a bottom base connecting therewith; wherein said walls of said storage region extend distally from said bottom base, said enclosure further comprising an upper cavity defining an open-ended lid region; said lid region pivotally fastened to said storage region for closing said storage region; said lid region comprising an upper wall, a lower wall, a pair of side walls connecting therebetween and a top base connecting therewith, wherein said walls of said lid region extend proximally from said top base towards said storage region for fastening thereto when said lid region is in a storage region closing position, wherein the proximal end of said lower wall of said lid region is pivotally connected to the distal end of said lower wall of said storage region;

wherein said audio means is inside the walls or base of either said upper cavity or lower cavity of said enclosure and comprises: (i) recording means for selectively recording sound input, (ii) playing means for audibly playing said sound input from said recording means and (iii) power means for powering said audio means, so that a user can record sound and play back sound upon command; and a visual component comprising at least one component on the surface of said enclosure for displaying photographs, handwritten notes and messages;

wherein said message from one individual to another comprises audio and visual components, whereby an individual records an audio message in said audio means and another individual selectively plays back the audio message.

6. The message delivery system according to claim 5, further comprising a plurality of compartments sized to fit adjacently within said enclosure, said compartments comprising a liquid proof construction, said compartments comprising a distal face and a proximal face, wherein said distal face of said compartments is integrally connected within said enclosure, said compartments comprising a lower edge, an upper edge and a pair of side edges, wherein said lower edge and said side edges of said compartments are fixedly sealed and said top edge of said compartments is selectively sealed for inserting and removing an item selected from the group consisting of said audio means and said visual component, wherein material of said proximal face of at least one of said compartments is transparent.

7. The message delivery system according to claim 6, further comprising fastening means for selectively sealing said upper edge of said compartments so that said item can be selectively removed or replaced within said compartments, wherein said first surface of said fastening means is affixed to said upper edge of said proximal face of said compartments and a second surface of said fastening means is secured to said upper edge of said distal face of said compartments for contacting said first surface of said fastening means, said fastening means extending along the upper edge of said proximal face and said distal face of said compartments.

8. The message delivery system according to claim 5, wherein said side walls of said lid region comprise a left wall and a right wall; wherein said playing means for said audio means comprises a round actuator extruding from said audio means; and wherein said lid region comprises a left and a right compartment, such that the outer face of at least one compartment comprises a transparent material so that said visual component can be inserted and viewed therethrough;

wherein said inside face of at least one compartment comprises a hole, wherein said hole is sized so that said actuator for said audio means can extrude through said hole so that a user can activate said audio means through said actuator.

9. The message delivery system according to claim 5, wherein said storage regions and said lid region are both constructed from a material selected from the group consisting of fabric, plastic and metal.

10. The message delivery system according to claim 7, wherein said fastening means comprises a pair of pressure-sensitive interlocking fastening surfaces.

11. The message delivery system according to claim 7, wherein said fastening means comprises a pair of pressure-sensitive adherent fastening surfaces.

12. The message delivery system according claim 5, wherein said storage region is liquid proof.

13. The lunchbox according to claim 1, wherein said voice recording mechanism further comprises a recording button visible on the surface of the walls or base of either said upper cavity or said lower cavity of the container.

14. The lunchbox according to claim 1, wherein the voice recording mechanism further comprises a separate volume control visible on the surface of the walls or base of either said upper cavity or said lower cavity of the container.

\* \* \* \* \*